US012429192B2

(12) United States Patent
Lan et al.

(10) Patent No.: US 12,429,192 B2
(45) Date of Patent: Sep. 30, 2025

(54) LIGHTING APPARATUS

(71) Applicant: LEEDARSON LIGHTING CO., LTD., Fujian (CN)

(72) Inventors: Tiansong Lan, Fujian (CN); Siyuan Su, Fujian (CN); Junjie Lin, Fujian (CN); Jiansheng Zhang, Fujian (CN); Haiyan Chen, Fujian (CN); Ting Luo, Fujian (CN)

(73) Assignee: LEEDARSON LIGHTING CO.,LTD., Zhangzhou (CN)

( * ) Notice: Subject to any disclaimer, the term of this patent is extended or adjusted under 35 U.S.C. 154(b) by 0 days.

(21) Appl. No.: 18/820,223

(22) Filed: Aug. 29, 2024

(65) Prior Publication Data

US 2025/0075884 A1 Mar. 6, 2025

(30) Foreign Application Priority Data

Aug. 29, 2023 (CN) ......................... 202322333529.2

(51) Int. Cl.
*F21V 17/00* (2006.01)
*F21S 4/00* (2016.01)
(Continued)

(52) U.S. Cl.
CPC ............ *F21V 17/002* (2013.01); *F21V 5/007* (2013.01); *F21V 17/104* (2013.01); *F21V 17/18* (2013.01); *F21S 4/00* (2013.01); *F21S 4/20* (2016.01); *F21S 4/28* (2016.01); *F21V 5/043* (2013.01); *F21V 17/107* (2013.01); *F21V 17/20* (2013.01); *F21V 21/04* (2013.01); *F21V 21/041* (2013.01); *F21V 21/042* (2013.01); *F21V 21/043* (2013.01);
(Continued)

(58) Field of Classification Search
CPC ........ F21V 17/107; F21V 17/18; F21V 17/20; F21V 21/04; F21V 21/041; F21V 21/042; F21V 21/043; F21V 21/044; F21V 21/045; F21V 21/046; F21V 21/047; F21V 21/048; F21V 21/049; F21V 5/043; F21S 4/00; F21S 4/20; F21S 4/28; H01Q 1/22–26; H01Q 1/40
See application file for complete search history.

(56) References Cited

U.S. PATENT DOCUMENTS 3,271,570 A * 9/1966 Kruger ...................... F21S 8/02
362/225
11,976,804 B1 * 5/2024 Xu ........................ F21V 17/104
(Continued)

*Primary Examiner* — Colin J Cattanach
(74) *Attorney, Agent, or Firm* — LANWAY IPR SERVICES; Chun-Ming Shih

(57) ABSTRACT

A lighting apparatus includes an optical component housing, an optical component and a light source. The optical component housing has an optical container and an entrance opening. The entrance opening is disposed on a lateral side of the optical component housing. The optical component housing has a light escape side. The lateral side is at a different plane as the light escape side. The optical component is detachably inserted into the optical container via the entrance opening.a cover manually operable to reveal the entrance opening for inserting the optical component and operable to conceal the entrance opening.a light source. A light is emitted from the light source passing through the optical component and escaped from the light escape side.

17 Claims, 8 Drawing Sheets

(51) Int. Cl.

| | |
|---|---|
| ***F21S 4/20*** | (2016.01) |
| ***F21S 4/28*** | (2016.01) |
| ***F21V 5/00*** | (2018.01) |
| ***F21V 5/04*** | (2006.01) |
| ***F21V 17/10*** | (2006.01) |
| ***F21V 17/18*** | (2006.01) |
| ***F21V 17/20*** | (2006.01) |
| ***F21V 21/04*** | (2006.01) |
| ***H01Q 1/22*** | (2006.01) |
| ***H01Q 1/40*** | (2006.01) |

(52) U.S. Cl.

CPC ........... *F21V 21/044* (2013.01); *F21V 21/045* (2013.01); *F21V 21/046* (2013.01); *F21V 21/047* (2013.01); *F21V 21/048* (2013.01); *F21V 21/049* (2013.01); *H01Q 1/22* (2013.01); *H01Q 1/40* (2013.01)

(56) References Cited

U.S. PATENT DOCUMENTS

2005/0190553 A1* 9/2005 Lynch ....................... F21S 4/10 362/227
2009/0323334 A1* 12/2009 Roberts ..................... F21S 4/28 362/247
2010/0103686 A1* 4/2010 Fowler, Jr. .............. F21V 17/18 362/374
2010/0177514 A1* 7/2010 Liu ......................... F21V 29/51 362/249.02
2019/0003657 A1* 1/2019 Gross ........................ F21L 4/02
2019/0190118 A1* 6/2019 Ozaki ....................... F21K 9/23
2021/0051784 A1* 2/2021 Wu ......................... F21V 29/89
2022/0357018 A1* 11/2022 Jurik ......................... F21V 9/40

* cited by examiner

LIGHTING APPARATUS

FIELD

The present invention is related to a lighting apparatus, and more particularly related to a lighting apparatus with a flexible configuration.

BACKGROUND

The development of LED (Light Emitting Diode) light devices has revolutionized the lighting industry, becoming the preferred choice for a wide range of applications. The journey of LED technology from niche uses to mainstream lighting solutions is a testament to the innovation and adaptability of these devices. LEDs are highly energy-efficient, consuming significantly less power than traditional incandescent bulbs while offering a longer lifespan. This efficiency has made them popular in both residential and commercial settings, contributing to substantial energy savings and a reduction in carbon footprints.

One of the key reasons for the widespread adoption of LED lights is their versatility. Unlike traditional lighting, which often comes in limited shapes and sizes, LEDs can be engineered in various forms, from small indicator lights to large panels. This flexibility allows for a broad spectrum of applications, including decorative lighting, task lighting, and even horticultural lighting. The ability to design LEDs in different colors without the need for filters also adds to their popularity, enabling dynamic and mood-enhancing lighting solutions.

Despite their advantages, the evolution of LED lighting continues as consumer and industrial needs grow more sophisticated. For instance, there is a growing demand for LED lights with added functionality, such as smart control features that allow users to adjust brightness, color temperature, and even lighting schedules through smartphones or voice commands. This integration with smart home systems is particularly appealing to tech-savvy consumers who seek convenience and customization in their lighting solutions.

Another area where LED lighting is evolving is in ease of installation. Consumers are increasingly looking for plug-and-play solutions that do not require professional installation. This demand has led to the development of more user-friendly products, such as adhesive-backed LED strips, modular lighting systems, and wireless options that can be easily set up and controlled without complex wiring. This trend towards simplicity is crucial in making advanced lighting technologies accessible to a broader audience.

The need for flexible settings in LED lighting is also growing. In commercial and residential environments, lighting requirements can vary significantly depending on the time of day, the activity being performed, or the mood the space should evoke. Adjustable LED lights that can change color temperature from warm to cool light, or that can be dimmed to various levels, are increasingly in demand. These features not only enhance the user experience but also contribute to energy efficiency by providing the right amount of light when and where it is needed.

Balancing the diverse needs of consumers and businesses while pushing the boundaries of LED technology is challenging. Manufacturers must consider factors such as cost, energy efficiency, ease of use, and the aesthetic appeal of their products. For instance, integrating advanced features like Wi-Fi control or motion sensors can drive up the cost, potentially limiting accessibility for some consumers. However, the continuous innovation in this space suggests that manufacturers are finding ways to offer these features without compromising affordability.

The widespread use of lighting in daily life means that even small improvements in LED technology can have a significant impact. For example, the development of LEDs that emit less blue light can contribute to better sleep patterns for users, addressing concerns about the impact of light exposure on circadian rhythms. Similarly, innovations that enhance the longevity and durability of LEDs can reduce waste and lower the environmental impact of lighting.

Furthermore, the integration of LEDs with renewable energy sources is another exciting development. Solar-powered LED lights, for instance, are becoming increasingly common, especially in outdoor applications. These lights provide a sustainable option for reducing energy consumption while offering the same, if not better, performance as traditional lighting systems. The marriage of LED technology with renewable energy sources underscores the potential for these lights to play a pivotal role in achieving global sustainability goals.

As LED technology continues to evolve, we are likely to see even more innovative applications that go beyond basic lighting. Concepts like human-centric lighting, which adjusts based on the time of day to support human health and well-being, are gaining traction. Similarly, LEDs integrated with sensors and AI could lead to more intelligent lighting systems that adapt to the user's needs without manual intervention, providing optimal lighting conditions in real-time. Each innovation in this field not only enhances the functionality of lighting but also contributes to the broader goal of improving the quality of life through better, smarter lighting solutions.

Industrial and mining lamps are critical lighting devices used in challenging environments such as factories, mines, and other industrial locations. These settings are typically harsh, characterized by high levels of dust, moisture, extreme temperatures, and sometimes exposure to corrosive chemicals. Consequently, the design and construction of these lamps must meet stringent requirements to ensure they operate reliably under such conditions.

One of the key challenges in these environments is the accumulation of dust and particulate matter on the lamps. In industrial settings, airborne particles can settle on the lamp surfaces, reducing their brightness and efficiency. Over time, this can lead to overheating and potential damage to the lamp. Therefore, industrial and mining lamps are often designed with features that minimize dust accumulation and facilitate easy cleaning to maintain optimal performance.

Moisture resistance is another crucial requirement for industrial and mining lamps. In many mining environments, especially underground, there is a significant presence of humidity or direct exposure to water. Lamps used in these settings must be sealed and constructed with materials that prevent water ingress, which could otherwise lead to electrical failures or corrosion of the lamp's components.

Temperature extremes, both high and low, also pose significant challenges for industrial and mining lamps. These lamps must be capable of functioning properly in environments where temperatures can fluctuate widely. Materials used in their construction are typically chosen for their ability to withstand such temperature variations without degrading, ensuring the lamp's longevity and consistent performance.

In addition to environmental factors, industrial and mining lamps must also be designed to endure physical impacts and vibrations. In many industrial settings and mining operations, equipment and structures are subject to regular vibrations, which can cause damage to standard lighting equipment. Therefore, these lamps are built with reinforced housings and secure mounting systems to prevent damage and ensure they remain operational under these conditions.

Another important consideration is the need for energy efficiency in industrial and mining lamps. Given that these lamps often need to operate continuously over extended periods, energy consumption becomes a significant factor. Modern designs incorporate energy-efficient technologies, such as LED lighting, to reduce power consumption while providing the necessary illumination levels.

The harsh chemical environments found in some industrial and mining locations require that these lamps be resistant to corrosive substances. Materials such as stainless steel or special coatings are often used in their construction to prevent corrosion, thereby extending the lifespan of the lamps and maintaining their safety and reliability.

Industrial and mining lamps are designed to meet the rigorous demands of their operating environments. Their construction takes into account factors such as dust and moisture resistance, temperature stability, durability against impacts and vibrations, energy efficiency, and resistance to corrosive substances. These considerations are essential to ensure that the lamps provide consistent and reliable lighting in the challenging conditions they are exposed to.

Finally, the ease of installation and the long-term durability of ceiling fans contribute to their enduring popularity. Unlike other cooling systems that may require complex installation and maintenance, ceiling fans are relatively straightforward to install and maintain. They are designed to last for many years, making them a cost-effective investment for homeowners and businesses alike. With the ability to enhance comfort, reduce energy costs, and add aesthetic value, ceiling fans continue to be a popular choice for climate control in a wide range of settings.

SUMMARY

In some embodiments, a lighting apparatus includes an optical component housing, an optical component and a light source.

The optical component housing has an optical container and an entrance opening.

The entrance opening is disposed on a lateral side of the optical component housing.

The optical component housing has a light escape side.

The lateral side is at a different plane as the light escape side.

The optical component is detachably inserted into the optical container via the entrance opening.

The cover manually operable to reveal the entrance opening for inserting the optical component and operable to conceal the entrance opening.

A light is emitted from the light source passing through the optical component and escaped from the light escape side.

In some embodiments, the optical component is a plate with multiple lens rows.

In some embodiments, the light source is disposed on an opposite side of the optical component housing.

In some embodiments, the lighting apparatus may also include a central housing.

The optical component housing is disposed on a first side of the central housing, where there is another optical component housing disposed on a second side of the central housing.

The optical component housing and said another optical component housing are symmetrically disposed on two sides of the central housing.

In some embodiments, a driver is disposed in the central housing for supplying driving currents respectively to the light sources disposed in the optical component housing and said another optical component housing.

In some embodiments, the lighting apparatus may also include a stop structure for keeping the cover at a current opening status, either when concealing the entrance opening or when revealing the entrance opening.

In some embodiments, the stop structure includes a gear unit and an elastic unit.

When a user operates the cover between opening and concealing the entrance opening, the cover engages to one of multiple stop positions and keeps the current opening status until an external force is applied again.

In some embodiments, the optical component housing has a lateral cover.

The lateral cover defines the entrance opening.

The cover and the stop structure are disposed on the lateral cover.

In some embodiments, the light source includes a light bar and a light housing.

The light housing is attached to the optical element housing to prevent the light bar being touched by users.

In some embodiments, the optical element housing has a sliding groove for inserting the optical component.

In some embodiments, there are multiple sliding grooves corresponding to different output light patterns.

The multiple sliding grooves have different distance to the light source.

A user selects one of the multiple sliding grooves to insert the optical component to get an associated light pattern.

In some embodiments, the optical component is replaceable when the optical component is deformed due to overheating.

In some embodiments, there are multiple types of optical components for users to select to place in the container of the optical component housing.

In some embodiments, the types include different colors

In some embodiments, the types include a diffusion lens and a condensing lens.

In some embodiments, the container has an extra space for storing an electronic device.

In some embodiments, the electronic device is an antenna.

The antenna is disposed on the optical component.

In some embodiments, the optical component housing has an electrode.

When the optical component is inserted to the container, the electrode electrically connects the electronic device to a controller for the light source.

In some embodiments, the electronic device stores an identifier to inform the controller a type data of the optical component.

In some embodiments, the cover has an elastic layer on an edge border of the cover to prevent water to enter the container.

DETAILED DESCRIPTION

Figure 6:
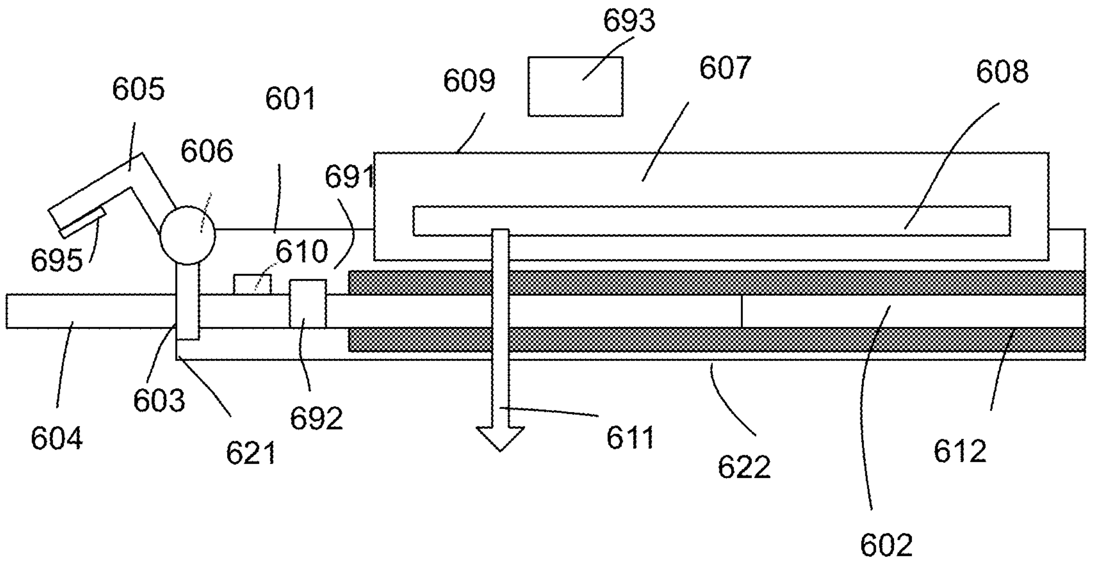
FIG. 6 illustrates another lighting apparatus embodiment.

In FIG. 6, a lighting apparatus includes an optical component housing 601, an optical component 604 and a light source 607.

The optical component housing 601 has an optical container 612 and an entrance opening 603.

The entrance opening 603 is disposed on a lateral side 621 of the optical component housing 607.

The optical component housing 601 has a light escape side 622.

The lateral side 621 is at a different plane as the light escape side 622. In this example, the light escape side 622 is perpendicular to the lateral side 621.

The optical component 604 is detachably inserted into the optical container 602 via the entrance opening 603.

In this example, the optical component 604 is a plate or elongated bar. For different design requirements, the optical component 604 may be different. For example, the optical component 604 may be condense lens, diffusion lens, diffusion plate, or color bar. The container 602 is a containing space for containing the optical component 604.

A cover 605 is manually operable to reveal the entrance opening 603 for inserting the optical component 603 and operable to conceal the entrance opening 603.

In other words, the cover 605 is selectively open or close by operation of a user. To insert the optical component 604

A light 611 is emitted from the light source 607 passing through the optical component 604 and escaped from the light escape side 622.

In some embodiments, the optical component is a plate with multiple lens rows.

Figure 7:
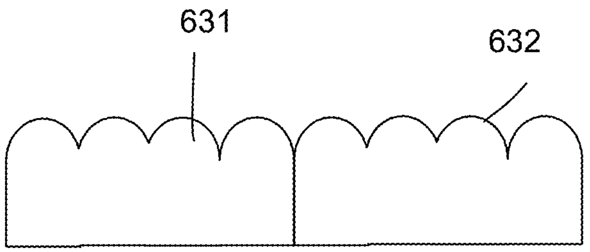
FIG. 7 shows a lens structure example.

FIG. 7 show that the optical component has a first lens module 631 and a second lens module 632. FIG. 7 shows a side view of the lens profile. In other words, the optical component may include multiple modules and each module may have multiple rows of lens, e.g. four convex lens rows in FIG. 7.

In some embodiments, the light source is disposed on an opposite side of the optical component housing.

In FIG. 6, the light source 607 is placed on an opposite side of the light escape side 622.

Figure 2:
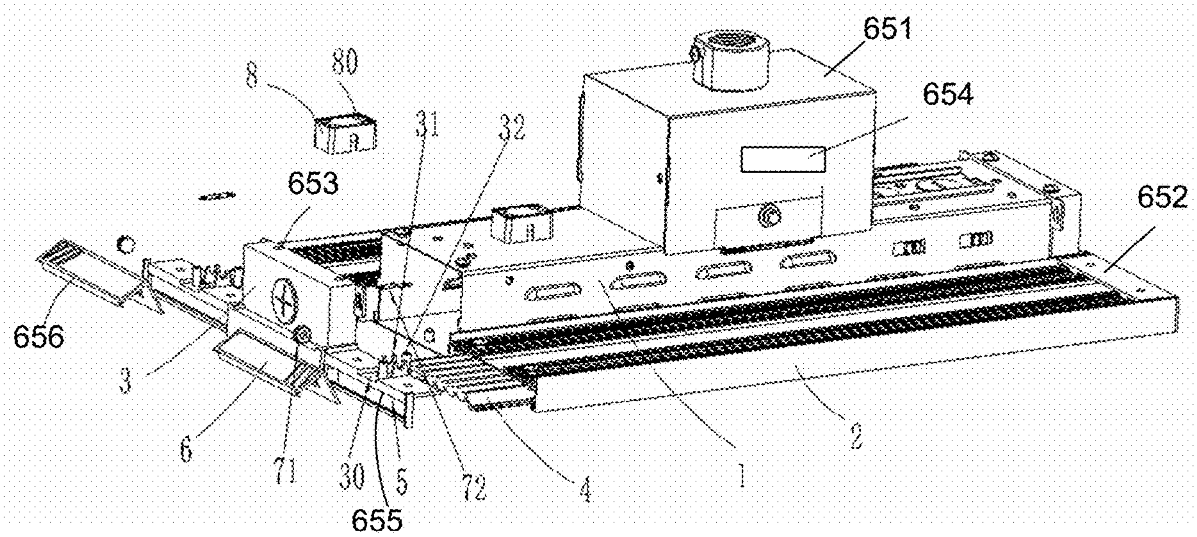
FIG. 2 illustrates an exploded view of the embodiment in FIG. 1.

In FIG. 2, the lighting apparatus may also include a central housing 651.

The optical component housing is disposed on a first side of the central housing, where there is another optical component housing disposed on a second side of the central housing.

The optical component housing and said another optical component housing are symmetrically disposed on two sides of the central housing.

In the example of FIG. 2, the central housing 651 is placed in the middle of two optical component housings 651 and 653 symmetrically disposed on two sides of the central housing 651.

In some embodiments, a driver 654 is disposed in the central housing 651 for supplying driving currents respectively to the light sources disposed in the optical component housing and said another optical component housing.

In FIG. 6, the lighting apparatus may also include a stop structure 606 for keeping the cover 605 at a current opening status, either when concealing the entrance opening or when revealing the entrance opening.

For example, the stop structure 606 is a rotation pivot but it is disposed with some structure to keep it staying in its current rotation angle unless an external force is applied thereon.

Figure 4:
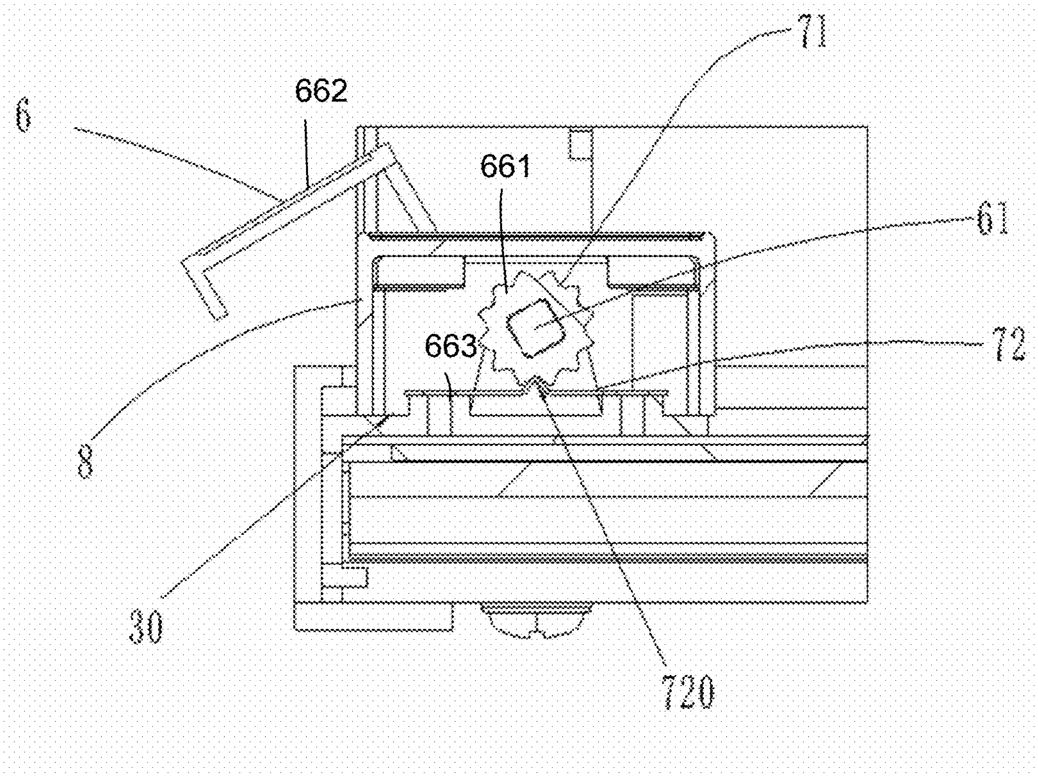
FIG. 4 illustrates a cross-section view of a cover opening structure with a gear structure.

In the example of FIG. 4, the stop structure includes a gear unit 661 and an elastic unit 663.

When a user operates the cover 662 between opening and concealing the entrance opening, the cover engages to one of multiple stop positions and keeps the current opening status until an external force is applied again.

In the example of FIG. 2, the optical component housing has a lateral cover 655.

The lateral cover 655 defines the entrance opening.

The cover 656 and the stop structure are disposed on the lateral cover 655.

In FIG. 6, the light source 607 includes a light bar 608 and a light housing 609.

The light housing 609 is attached to the optical element housing 601 to prevent the light bar 608 being touched by users. For example, the light housing 609 may be a plastic cover that has an opening facing to the optical component 604, but there is no opening that users may enter to touch the light bar 608 directly.

In FIG. 6, the optical element housing has a sliding groove 612 for inserting the optical component 604.

Figure 8:
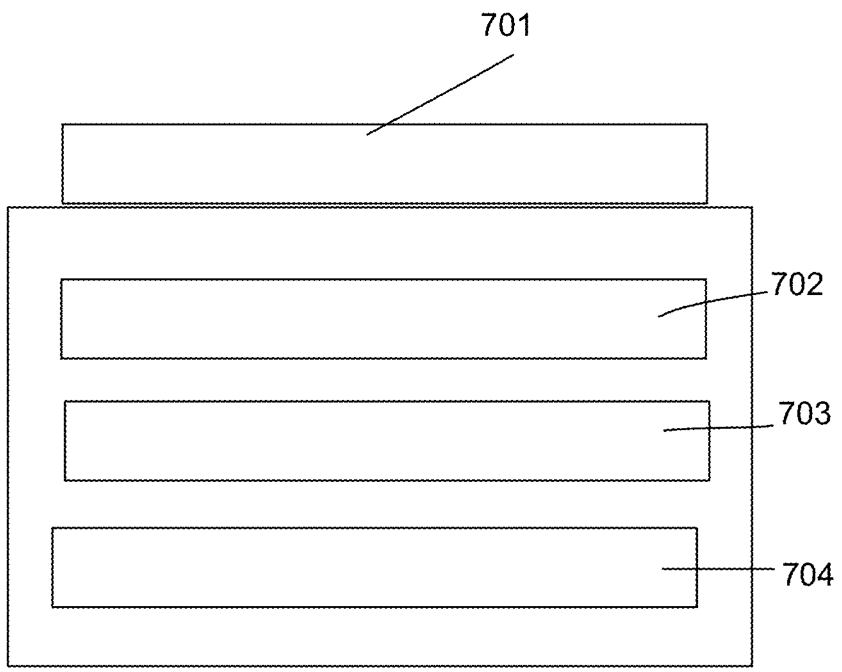
FIG. 8 shows multiple sliding groove for changing a light pattern.

In FIG. 8 some embodiments, there are multiple sliding grooves 702, 703, 704 corresponding to different output light patterns.

The multiple sliding grooves 702, 703, 704 have different distance to the light source 701. Therefore, users may select one of the three sliding grooves to insert the optical component to change an output light pattern.

A user selects one of the multiple sliding grooves to insert the optical component to get an associated light pattern.

In some embodiments, the optical component is replaceable when the optical component is deformed due to overheating.

This is particularly important for industrial light device when the light source emits a strong light, which usually causes high heat applied on the lens component.

With such design, when the optical component is damaged, it can be easily replaced with a new one instead of dropping the whole lighting apparatus.

In some embodiments, there are multiple types of optical components for users to select to place in the container of the optical component housing.

In some embodiments, the types include different colors.

In some embodiments, the types include a diffusion lens and a condensing lens.

In FIG. 6, the container has an extra space 691 for storing an electronic device 610.

In some embodiments, the electronic device is an antenna.

The antenna is disposed on the optical component. Such design makes the antenna more close to the ground, easier to avoid interference and blocking of wireless signal.

In some embodiments, the optical component housing has an electrode 692.

When the optical component is inserted to the container, the electrode 692 electrically connects the electronic device 610 to a controller 693 for the light source 607.

In some embodiments, the electronic device stores an identifier to inform the controller a type data of the optical component. For example, the electronic device is an integrated chip that has a memory circuit to store a type information of the optical module. This is very useful because the controller 693 may change its control signal based on the identifier that indicates the type of the optical component 604.

In some embodiments, the cover has an elastic layer 695 on an edge border of the cover 605 to prevent water to enter the container.

Figure 1:
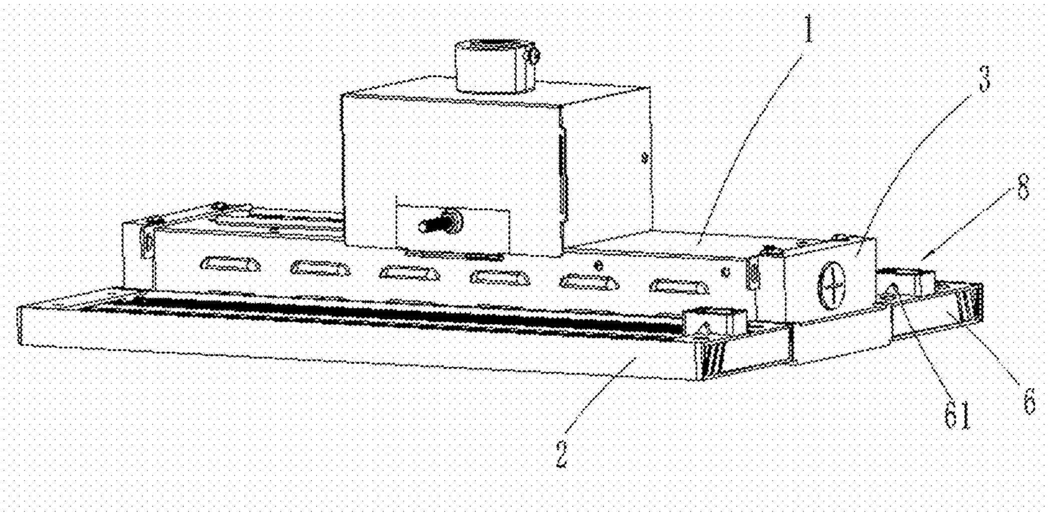
FIG. 1 illustrates a perspective view of a lighting apparatus embodiment.
Figure 3:
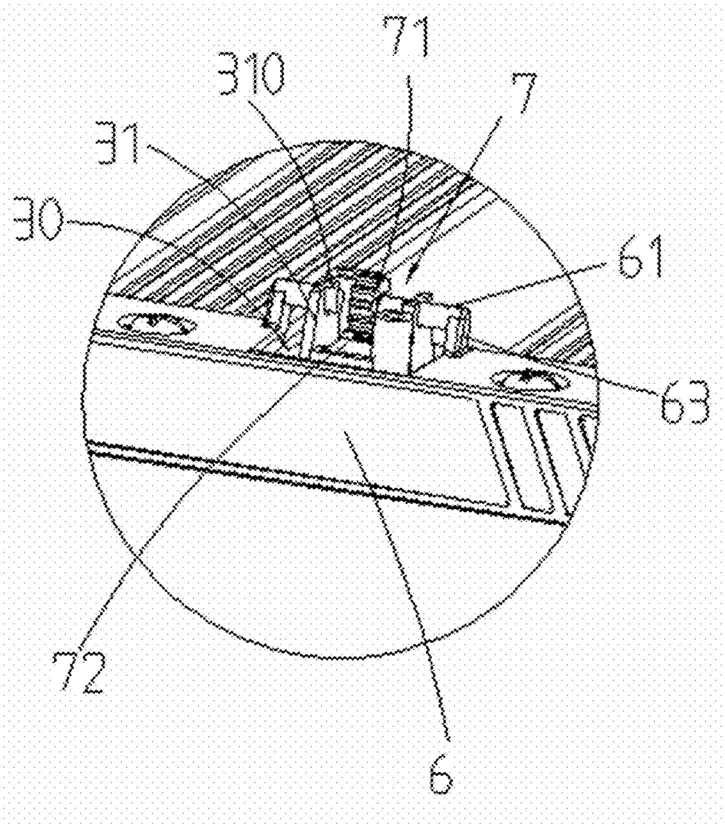
FIG. 3 illustrates a zoom-up view of the cover structure.

FIG. 1 is an assembly diagram of an industrial and mining lamp with a lens that can be conveniently replaced, according to the present utility model. FIG. 2 is an exploded view of the industrial and mining lamp with a lens that can be conveniently replaced, and FIG. 3 is an assembly diagram of the side cover and the rotational positioning device. As shown in FIGS. 1-3, the present utility model provides an industrial and mining lamp with a lens that can be conveniently replaced, which includes:

A heat-dissipating lamp body 1, comprising a main plate 2 and two end caps 3 respectively fitted to both ends of the main plate 2;

A light-emitting module (not shown), arranged on the inner surface of the main plate 2; and A lens 4, which is fitted over the light-emitting module and is detachably connected to the main plate 2.

The side of the end cap 3 is provided with a lens exit 5 and a corresponding side cover 6 for the lens exit. One end of the side cover 6 is equipped with a rotating shaft 61, which is movably connected to the end cap 3. The surface of the side cover adjacent to the rotating shaft 61 has a through opening. The end cap 3 further includes a rotational positioning device 7, through which the rotating shaft 61 passes at the rotational center and engages with the rotational positioning device 7. When the rotational positioning device 7 rotates, the side cover 6 rotates to open the lens exit 5.

By providing a side cover 6 and a rotational positioning device 7 on the end cap 3, one end of the side cover 6 is configured to rotate relative to the end cap, thereby opening the lens exit 4. The rotating shaft 61 of the side cover 6 engages with the rotational positioning device 7, which controls the rotation of the side cover 6 and its positioning after rotation. As a result, simply toggling the rotational positioning device 7 opens the side cover 6, exposing the lens 4 without the need to disassemble the lamp body or use tools to remove screws. Moreover, the side cover does not need to be manually held in place, allowing a single person to replace the lens, making the operation of replacing the lens convenient, quick, and time-saving.

The rotational positioning device can be positioned on the horizontal plane of the end cap or on the vertical plane, as long as it forms a rotational positioning relationship with the side cover. All such configurations are within the protective scope of this utility model.

In specific embodiments, as shown in FIGS. 2-4, the rotational positioning device 7 includes a gear 71 and a spring clip 72. The spring clip 72 is fixedly mounted on the end cap 3, and the rotating shaft 61 passes through the rotational center of the gear 71 and engages with it. A bump 720 is provided on the middle of the spring clip 72 facing upward, which engages with the toothed edge of the gear 71 for positioning. The rotational positioning device 7 can be selected as a gear and gear latch structure that works in conjunction with a spring clip with a bump. By toggling the gear 71, the side cover 6 is driven to rotate, and the toothed edge of the gear works in conjunction with the bump 720 on the spring clip for positioning. This structure is simple and easy to operate.

When rotation is needed, the gear 71 is manually toggled to rotate around the rotating shaft 61. Due to the elasticity of the spring clip 72, the gear 71 can press down on the bump 720 of the spring clip to rotate. Once the rotation is completed and the lens 4 is exposed, the bump 720 on the spring clip engages between the teeth of the gear 71 for positioning, causing the side cover 6 to stop rotating and preventing it from falling. This allows the lens 4 to be easily removed for replacement without needing to hold the side cover 6 manually.

Figure 5:
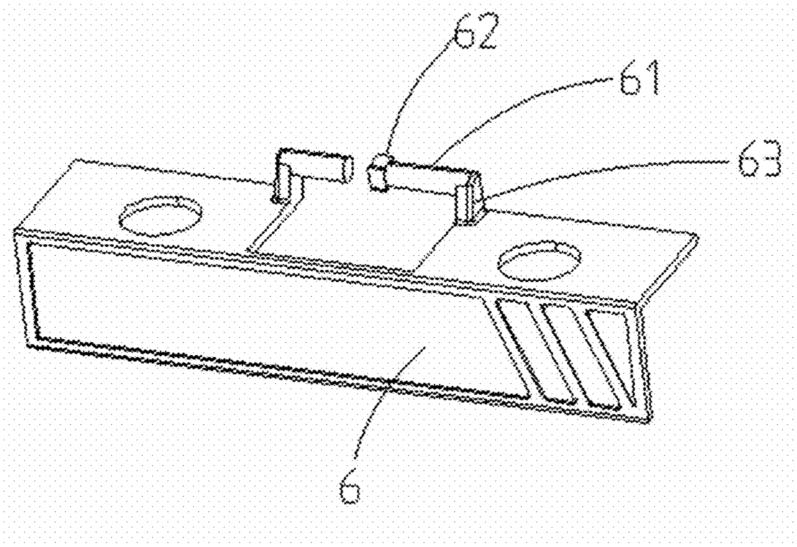
FIG. 5 illustrates a cover component example.

In specific embodiments, as shown in FIGS. 4-5, the central inner hole of the gear 71 is square, and the connection point between the rotating shaft 61 and the gear 71 is equipped with a square pin 62 that matches the central inner hole. The engagement between the rotating shaft and the gear is achieved using a square pin, making the structure relatively simple to manufacture and process.

In another specific embodiment, with continued reference to FIG. 2, the outer surface of the end cap 3 is also provided with a groove 30, within which a set of parallel support bases 31 is fixedly arranged. The support bases 31 have through-holes 310 through which the rotating shaft 61 can be inserted. The gear 71 is positioned between the support bases 31, and the spring clip 72 is fixedly mounted on the bottom surface of the groove 30 between the two support bases 31, where it engages with the gear 71. The support bases 31 provide stable support for the rotating shaft 61. Placing the rotational positioning device 7 within the groove 30 reduces the height of the combined rotational positioning device 7 and side cover 6, preventing excessive gaps between the side cover 6 and the main plate 1.

In another specific embodiment, as shown in FIG. 5, a pair of fixing seats 63 is oppositely arranged on the outer surface of the side cover 6, and both ends of the rotating shaft 61 are fixedly connected to the fixing seats 63. When the gear 71 drives the rotating shaft 61 to rotate, it simultaneously drives the rotation of the side cover 6.

In yet another specific embodiment, with continued reference to FIG. 2, the end cap 3 is also provided with a cap 8 containing an internal cavity. At least one positioning pin 32 is fixedly arranged within the groove 30, and the top surface of the cap 8 is equipped with at least one through positioning hole 80 that matches the positioning pin. The support bases 31 and the rotational positioning device 7 are housed within the cap 8. The cap 8 serves to protect and cover the rotational positioning device 7, preventing accidental contact, while also providing a dustproof function.

In a specific embodiment, as shown in FIG. 2, there are two positioning pins 80, distributed along the diagonal direction of the cap. The two positioning pins distributed along the diagonal direction of the cap provide more stable positioning for the square cap, preventing the cap from shifting and avoiding accidental contact with the gear.

In another specific embodiment, as shown in FIG. 5, the side cover 6 is L-shaped. The L-shaped side cover is an advantageous embodiment, as the vertical edge of the L-shape can effectively cover the lens opening without the need for additional structures such as screws for fixation.

In a further specific embodiment, with continued reference to FIG. 5, the rotating shaft 61 has a break in the middle, which is positioned between the support base 31 and the gear 71. The break in the middle of the rotating shaft 61 facilitates the assembly of the gear 71 and the rotating shaft 61.

This utility model provides a solution by setting a side cover and a rotational positioning device on the end cap, with one end of the side cover configured to rotate relative to the end cap to open the lens exit. The rotating shaft of the side cover engages with the rotational positioning device, which controls the rotation of the side cover and its positioning after rotation. As a result, simply toggling the rotational positioning device opens the side cover, exposing the lens, without the need to disassemble the lamp body or use tools to remove screws. Moreover, the side cover does not need to be manually held in place, allowing a single person to replace the lens, making the operation convenient, quick, and time-saving.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:

an optical component housing having an optical container and an entrance opening, wherein the entrance opening is disposed on a lateral side of the optical component housing, wherein the optical component housing has a light escape side, wherein the lateral side is at a different plane as the light escape side;

an optical component detachably inserted into the optical container via the entrance opening;

a cover manually operable to reveal the entrance opening for inserting the optical component and operable to conceal the entrance opening; and a light source, wherein a light is emitted from the light source passing through the optical component and escaped from the light escape side, wherein the optical container has an extra space for storing an electronic device, wherein the optical component housing has an electrode, wherein when the optical component is inserted to the container, the electrode electrically connects the electronic device to a controller for the light source, wherein the electronic device stores an identifier to inform the controller of a type of data of the optical component.

2. The lighting apparatus of claim 1, wherein the optical component is a plate with multiple lens rows.

3. The lighting apparatus of claim 2, wherein the light source is disposed on an opposite side of the optical component housing.

4. The lighting apparatus of claim 3, further comprising a central housing, wherein the optical component housing is disposed on a first side of the central housing, where there is another optical component housing disposed on a second side of the central housing, wherein the optical component housing and said another optical component housing are symmetrically disposed on two sides of the central housing.

5. The lighting apparatus of claim 4, wherein a driver is disposed in the central housing for supplying driving currents respectively to the light sources disposed in the optical component housing and said another optical component housing.

6. The lighting apparatus of claim 1, further comprising a stop structure for keeping the cover at a current opening status, either when concealing the entrance opening or when revealing the entrance opening.

7. The lighting apparatus of claim 6, wherein the stop structure comprises a gear unit and an elastic unit, wherein when user operates the cover between opening and concealing the entrance opening, the cover engages to one of multiple stop positions and keeps the current opening status until an external force is applied again.

8. The lighting apparatus of claim 1, wherein the optical component housing has a lateral cover, wherein the lateral cover defines the entrance opening, wherein the cover and a stop structure are disposed on the lateral cover.

9. The lighting apparatus of claim 1, wherein the light source comprises a light bar and a light housing, wherein the light housing is attached to the optical component housing to prevent the light bar from being touched by users.

10. The lighting apparatus of claim 1, wherein the optical component housing has a sliding groove for inserting the optical component.

11. The lighting apparatus of claim 10, wherein there are multiple sliding grooves corresponding to different output light patterns, wherein the multiple sliding grooves have different distance to the light source, wherein a user selects one of the multiple sliding grooves to insert the optical component to get an associated light pattern.

12. The lighting apparatus of claim 1, wherein the optical component is replaceable when the optical component is deformed due to overheating.

13. The lighting apparatus of claim 1, wherein there are multiple types of optical components for users to select to place in the optical container of the optical component housing.

14. The lighting apparatus of claim 13, wherein the types include different colors.

15. The lighting apparatus of claim 13, wherein the types include a diffusion lens and a condensing lens.

16. The lighting apparatus of claim 1, wherein the electronic device is an antenna, wherein the antenna is disposed on the optical component.

17. The lighting apparatus of claim 1, wherein the cover has an elastic layer on an edge border of the cover to prevent water to enter the container.

* * * * *